(12) United States Patent
Hosseini et al.

(10) Patent No.: US 12,402,076 B2
(45) Date of Patent: Aug. 26, 2025

(54) POWER CONSUMPTION OPTIMIZATION UNDER DISCONTINUOUS RECEPTION

(71) Applicant: QUALCOMM Incorporated, San Diego, CA (US)

(72) Inventors: Seyedkianoush Hosseini, San Diego, CA (US); Yuchul Kim, San Diego, CA (US); Qing Li, Princeton Junction, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 17/662,578

(22) Filed: May 9, 2022

(65) Prior Publication Data

US 2022/0361105 A1 Nov. 10, 2022

Related U.S. Application Data

(60) Provisional application No. 63/201,709, filed on May 10, 2021.

(51) Int. Cl.
*H04W 52/02* (2009.01)
*H04W 28/26* (2009.01)
*H04W 72/02* (2009.01)
*H04W 72/0446* (2023.01)
*H04W 72/20* (2023.01)

(52) U.S. Cl.
CPC ....... *H04W 52/0232* (2013.01); *H04W 28/26* (2013.01); *H04W 72/02* (2013.01); *H04W 72/0446* (2013.01); *H04W 72/20* (2023.01)

(58) Field of Classification Search
CPC . H04W 52/0232; H04W 28/26; H04W 72/02; H04W 72/0446; H04W 72/20; H04W 92/18; H04W 72/25; H04W 76/28; Y02D 30/70
See application file for complete search history.

(56) References Cited

U.S. PATENT DOCUMENTS

2021/0314821 A1* 10/2021 Huang ................ H04L 12/2869
2022/0345901 A1* 10/2022 Wang ................... H04W 16/28

* cited by examiner

*Primary Examiner* — Joseph E Dean, Jr.
(74) *Attorney, Agent, or Firm* — Harrity & Harrity, LLP

(57) ABSTRACT

Various aspects of the present disclosure generally relate to wireless communication. In some aspects, a first user equipment (UE) may configure a discontinuous reception (DRX) cycle of the first UE for a sidelink connection with a second UE. The UE may identify a mode that specifies whether the first UE is to receive a communication outside of an on duration of the DRX cycle if the on duration is extended due to receiving sidelink control information (SCI) reserving a resource outside of the on duration. The UE may communicate in accordance with the mode. Numerous other aspects are described.

30 Claims, 10 Drawing Sheets

POWER CONSUMPTION OPTIMIZATION UNDER DISCONTINUOUS RECEPTION

CROSS-REFERENCE TO RELATED APPLICATION

This Patent Application claims priority to U.S. Provisional Patent Application No. 63/201,709, filed on May 10, 2021, entitled "POWER CONSUMPTION OPTIMIZATION UNDER DISCONTINUOUS RECEPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power consumption optimization under discontinuous reception.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes configuring a discontinuous reception (DRX) cycle of the first UE for a sidelink connection with a second UE; identifying a mode that specifies whether the first UE is to receive a communication outside of an on duration of the DRX cycle if the on duration is extended due to receiving sidelink control information (SCI) reserving a resource outside of the on duration; and communicating in accordance with the mode.

In some aspects, a method of wireless communication performed by a first UE includes receiving information indicating a DRX cycle of a second UE for a sidelink connection between the first UE and the second UE; identifying a mode that specifies whether the second UE is to receive a communication outside of an on duration of the DRX cycle if the on duration is extended due to receiving SCI reserving a resource outside of the on duration; and communicating in accordance with the mode.

In some aspects, a first UE for wireless communication includes a memory; and one or more processors, coupled to the memory, configured to: configure a DRX cycle of the first UE for a sidelink connection with a second UE; identify a mode that specifies whether the first UE is to receive a communication outside of an on duration of the DRX cycle if the on duration is extended due to receiving SCI reserving a resource outside of the on duration; and communicate in accordance with the mode.

In some aspects, a first UE for wireless communication includes a memory; and one or more processors, coupled to the memory, configured to: receive information indicating a DRX cycle of a second UE for a sidelink connection between the first UE and the second UE; identify a mode that specifies whether the second UE is to receive a communication outside of an on duration of the DRX cycle if the on duration is extended due to receiving SCI reserving a resource outside of the on duration; and communicate in accordance with the mode.

In some aspects, a non-transitory computer-readable medium storing a set of instructions for wireless communication includes one or more instructions that, when executed by one or more processors of a first UE, cause the UE to: configure a DRX cycle of the first UE for a sidelink connection with a second UE; identify a mode that specifies whether the first UE is to receive a communication outside of an on duration of the DRX cycle if the on duration is extended due to receiving SCI reserving a resource outside of the on duration; and communicate in accordance with the mode.

In some aspects, a non-transitory computer-readable medium storing a set of instructions for wireless communication includes one or more instructions that, when executed by one or more processors of a first UE, cause the first UE to: receive information indicating a DRX cycle of a second UE for a sidelink connection between the first UE and the second UE; identify a mode that specifies whether the second UE is to receive a communication outside of an on duration of the DRX cycle if the on duration is extended due to receiving SCI reserving a resource outside of the on duration; and communicate in accordance with the mode.

In some aspects, an apparatus for wireless communication includes means for configuring a DRX cycle of the apparatus for a sidelink connection with a second UE; means for identifying a mode that specifies whether the apparatus is to receive a communication outside of an on duration of the DRX cycle if the on duration is extended due to receiving SCI reserving a resource outside of the on duration; and means for communicating in accordance with the mode.

In some aspects, an apparatus for wireless communication includes means for receiving information indicating a DRX cycle of a second UE for a sidelink connection between the apparatus and the second UE; means for identifying a mode that specifies whether the second UE is to receive a communication outside of an on duration of the DRX cycle if the on duration is extended due to receiving SCI reserving a resource outside of the on duration; and means for communicating in accordance with the mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
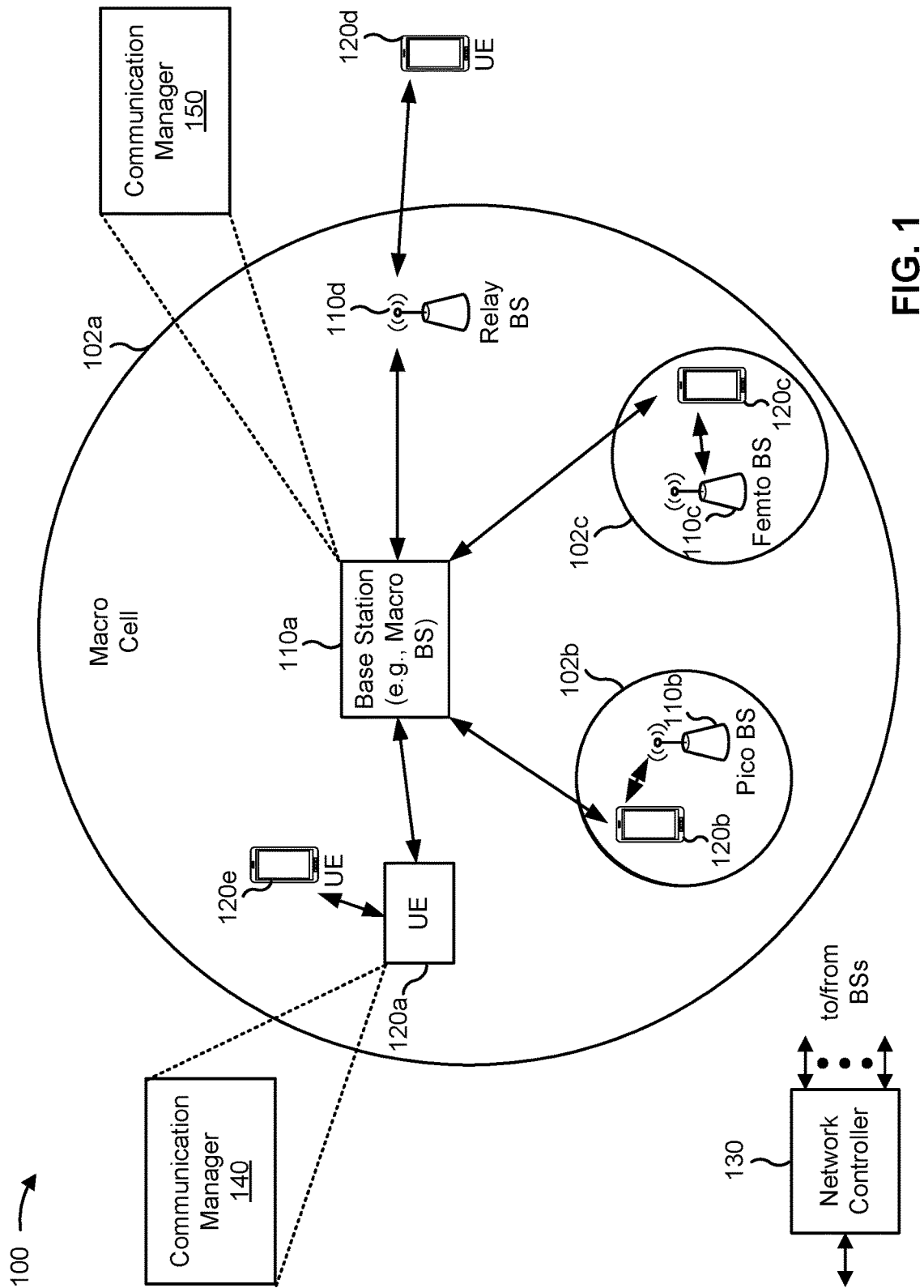
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., New Radio (NR)) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle to pedestrian (V2P)), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based at least in part on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may perform one or more processes associated with power consumption optimization under discontinuous reception. Additionally, or alternatively, the communication manager 140 may perform one or more other operations described herein.

In some aspects, the base station 110 may include a communication manager 150. As described in more detail elsewhere herein, the communication manager 150 may perform one or more processes associated with power consumption optimization under discontinuous reception. Additionally, or alternatively, the communication manager 150 may perform one or more other operations described herein.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station, 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
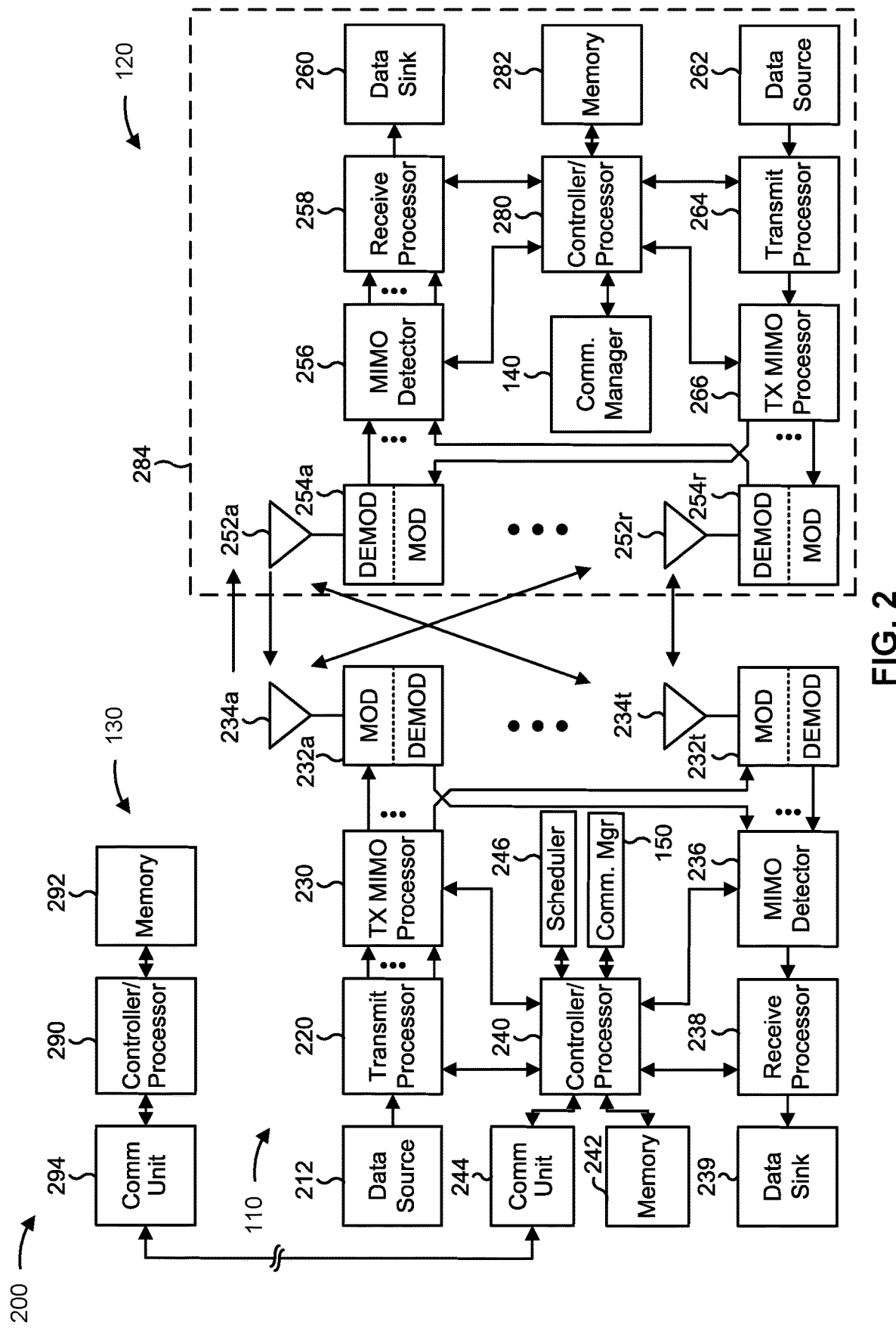
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 6.

Controller/processor 240 of base station 110, controller/processor 280 of UE 120, and/or any other component(s) of FIG. 2 may perform one or more techniques associated with power consumption optimization under discontinuous reception, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a first UE (e.g., UE 120) includes means for configuring a DRX cycle of the first UE for a sidelink connection with a second UE; means for identifying a mode that specifies whether the first UE is to receive a communication outside of an on duration of the DRX cycle if the on duration is extended due to receiving SCI reserving a resource outside of the on duration; and/or means for communicating in accordance with the mode. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a first UE (e.g., UE 120, the second UE described immediately above) includes means for receiving information indicating a DRX cycle of a second UE for a sidelink connection between the first UE and the second UE; means for identifying a mode that specifies whether the second UE is to receive a communication outside of an on duration of the DRX cycle if the on duration is extended due to receiving SCI reserving a resource outside of the on duration; and/or means for communicating in accordance with the mode. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
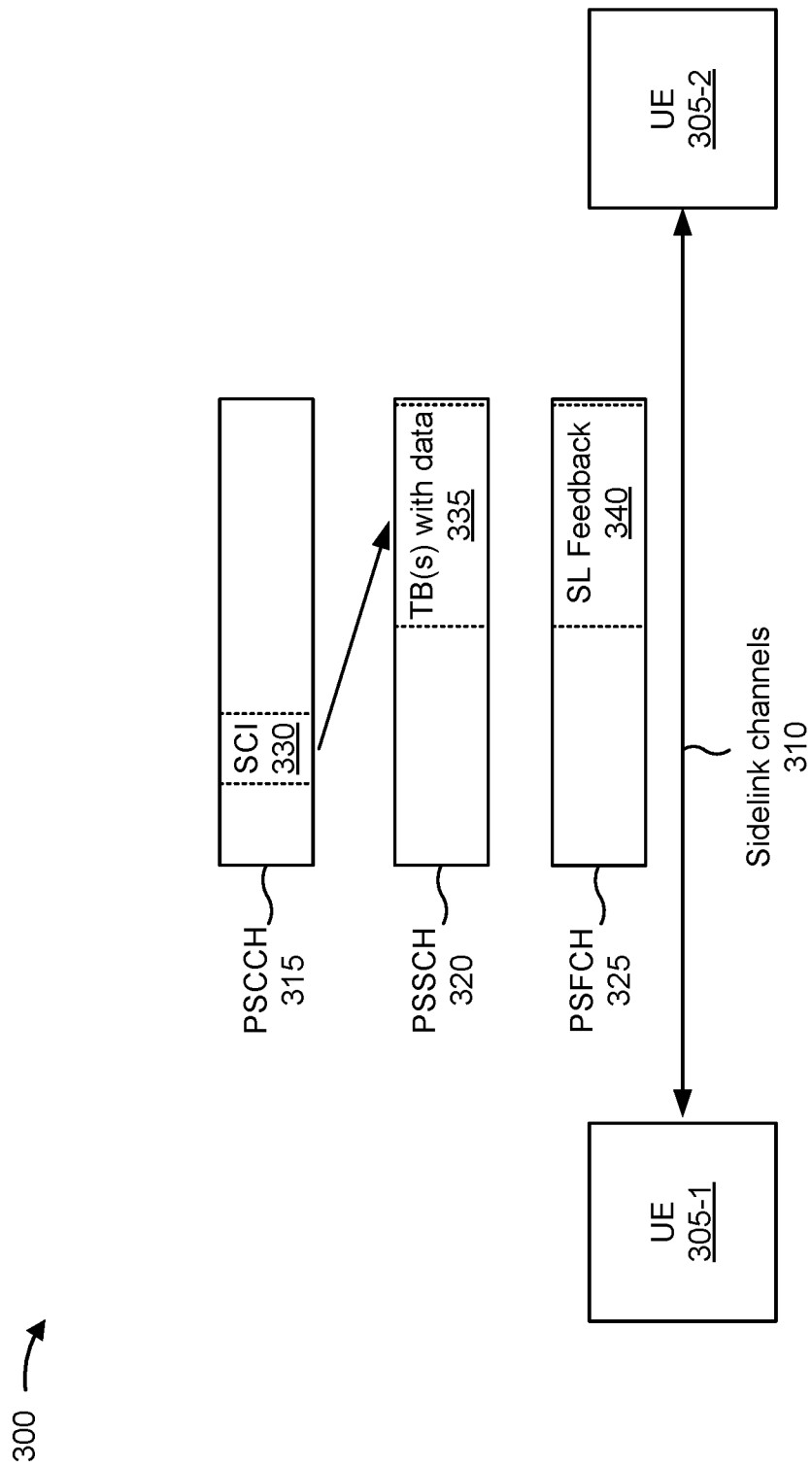
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for communications via a wireless local area network (such as a WiFi network), communications via a personal area network (such as a Bluetooth network), P2P communications, D2D communications, V2X communications (e.g., which may include V2V communications, V2I communications, and/or V2P communications), and/or mesh networking. In some aspects, the UEs 305 (e.g., UE 305-1 and/or UE 305-2) may be one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, a UE 305 may be configured for sidelink discontinuous reception (DRX). DRX is a mechanism in which a UE 305 transitions between an active state and an inactive state in order to reduce power consumption, as described in further detail below. Techniques described herein provide for selective reception, during an active state, of communications that were not originally scheduled during the active state, as described in more detail elsewhere herein.

As indicated above, FIG. 3 is provided as an example. Other examples may differ from what is described with respect to FIG. 3.

Figure 4:
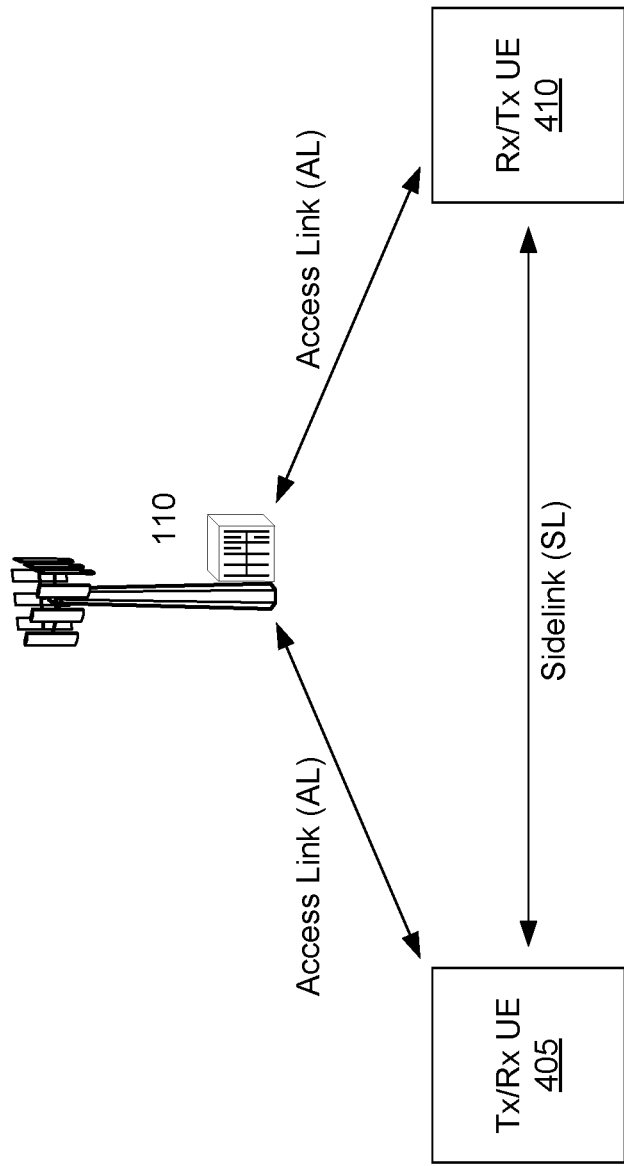
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, the UEs 120 may be configured for sidelink DRX and/or access link DRX, as described in greater detail below. Sidelink DRX may refer to a UE 120 utilizing DRX for sidelink communications. Access link DRX may refer to a UE 120 utilizing DRX for access link communications.

As indicated above, FIG. 4 is provided as an example. Other examples may differ from what is described with respect to FIG. 4.

Figure 5:
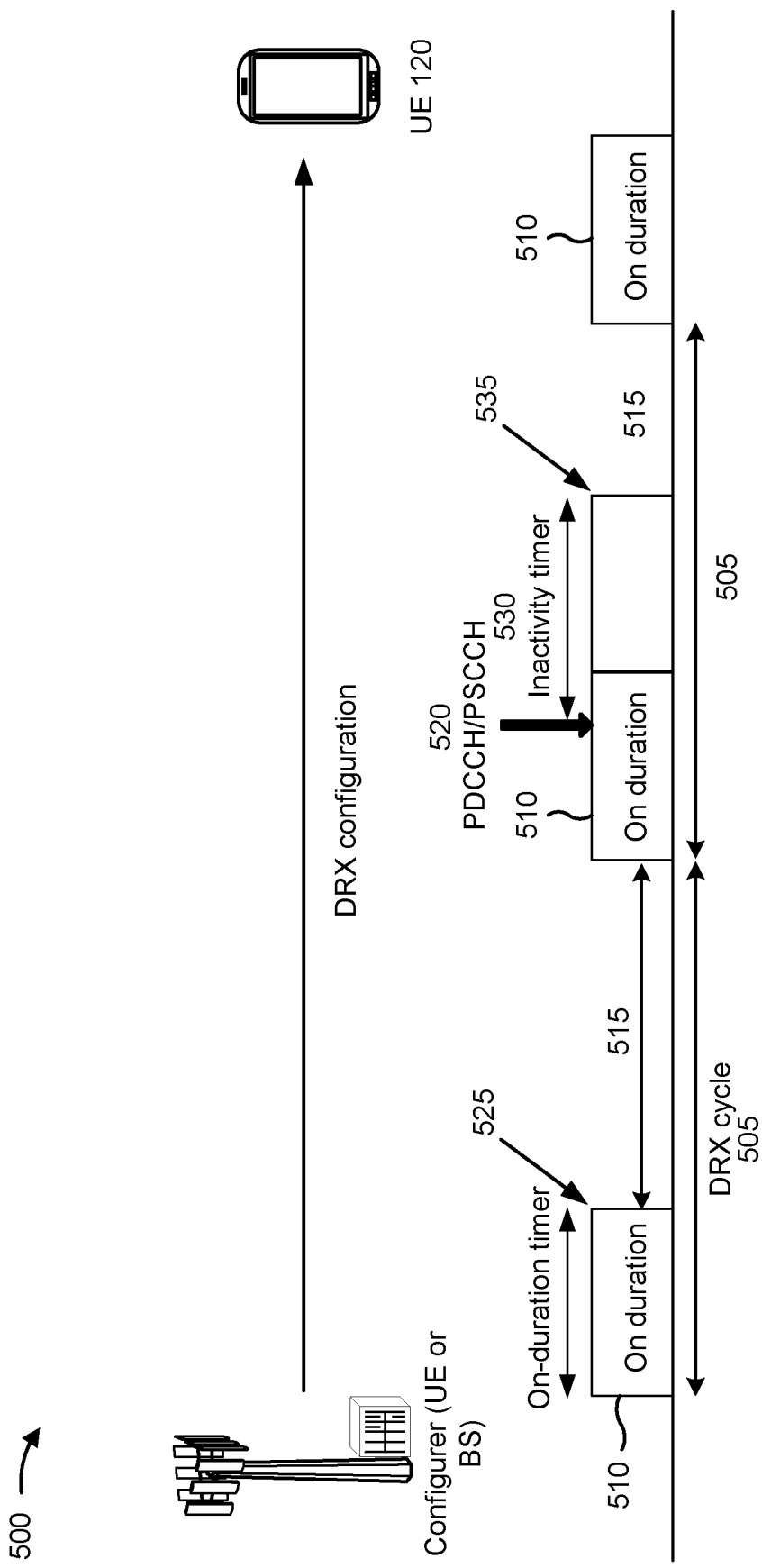
FIGS. 5 and 6 are diagrams illustrating examples associated with power consumption optimization under discontinuous reception, in accordance with the present disclosure.

FIG. 5 is a diagram illustrating an example 500 of a DRX configuration, in accordance with the present disclosure.

As shown in FIG. 5, a configurer (e.g., a base station 110 (such as a central unit) or a UE 120) may transmit a DRX configuration (e.g., an access link DRX configuration and/or a sidelink DRX configuration) to a UE 120 to configure a DRX cycle 505 for the UE 120. A DRX cycle 505 may include a DRX on duration 510 (e.g., during which a UE 120 is awake or in an active state) and an opportunity to enter a DRX sleep state 515. The time during which the UE 120 is configured to be in an active state during the DRX on duration 510 plus any extension of the on duration 510 due to an inactivity timer may be referred to as an active time, and the time during which the UE 120 is configured to be in the DRX sleep state 515 may be referred to as an inactive time. As described herein, the UE 120 may monitor a control channel (e.g., a PDCCH and/or a PSSCH) during the active time and may refrain from monitoring the downlink control channel during the inactive time.

During the DRX on duration 510, the UE 120 may monitor a control channel, as shown by reference number 520. For example, the UE 120 may monitor the control channel for control information (e.g., downlink control information (DCI) and/or SCI) pertaining to the UE 120. If the UE 120 does not detect and/or successfully decode any control channel communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a control channel communication intended for the UE 120, then the UE 120 may remain in an active state (e.g., awake) for the duration of a DRX inactivity timer 530 (e.g., which may extend into the configured inactive time of the current DRX cycle). The UE 120 may start the DRX inactivity timer 530 at a time at which the control channel communication is received (e.g., in a TTI in which the control channel communication is received, such as a slot or a subframe). The UE 120 may remain in the active state until the DRX inactivity timer 530 expires, at which time the UE 120 may enter the sleep state 515 (e.g., for the remainder of the inactive time of the current DRX cycle), as shown by reference number 535. During the duration of the DRX inactivity timer 530, the UE 120 may continue to monitor for control channel communications, may obtain a downlink data communication (e.g., on a data channel, such as a PDSCH and/or a PSSCH) scheduled by the control channel communication, and/or may prepare and/or transmit a communication (e.g., on a PUSCH and/or a PSSCH) scheduled by the control channel communication. The UE 120 may restart the DRX inactivity timer 530 after each detection of a control channel communication for the UE 120 for an initial transmission (e.g., but not for a retransmission). By operating in this manner, the UE 120 may conserve battery power and reduce power consumption by entering the sleep state 515.

In some cases, for sidelink communications, the inactivity timer may be triggered when a UE 120 receives an SCI during the on duration of the DRX cycle and the SCI indicates reservations for the retransmission of the same TB outside of the on duration of the DRX cycle (e.g. during the inactive time of the DRX cycle). In some cases, the UE 120 may extend the active time to include the reservations for the retransmission of the TB, and may only be expected to perform reception on the indicated resources for the retransmission of the TB. In other words, the UE 120 may not receive a new TB (that is, a TB that was not scheduled or reserved during the on duration of the DRX cycle, or a TB that is not a repetition of a TB scheduled or reserved during the on duration of the DRX cycle). By only performing reception on the indicated resources for the retransmission, the transmission of any new TBs may be delayed until the next on duration of the DRX cycle, which may result in the transmission of the new TBs incurring additional latency.

Alternatively, the UE 120 may extend the active time to include the reservations for the retransmission of the TB, and may receive additional TBs other than the retransmission of the TB. For example, the UE 120 may receive TBs that were not originally scheduled or reserved by SCI received during the on duration of the DRX cycle, such as on resources not associated with a reservation for the TBs. However, receiving TBs in addition to the retransmission of the TB may increase a power consumption of the UE 120 relative to a power consumption associated with only performing reception on the indicated resources for the retransmission, since the UE 120 must monitor all subchannels in all slots while the inactivity timer is running, so the UE 120 cannot go to sleep.

Some techniques and apparatuses described herein enable a UE to configure different modes of DRX for sidelink communications. For example, when an inactivity timer is triggered based at least in part on the UE receiving an SCI during the on duration of a DRX cycle and the SCI indicates reservations for the retransmission of the same TB outside of the on duration of the DRX cycle, the UE can be configured to perform one of multiple DRX mode operations, where each DRX mode operation is associated with a DRX mode.

One DRX mode described herein may be associated with the UE only performing reception on the indicated resources for the transmission (such as resources reserved during the on duration). Another DRX mode described herein may be associated with the UE performing reception of TBs other than the TB associated with the indicated resources for the transmission that led to extension of the on duration. In some aspects, the UE may perform reception of the TBs other than the TB associated with the indicated resources when a UE with which the UE is communicating via a sidelink indicates that the UE intends to transmit new TBs outside of the on duration of the DRX cycle. Yet another DRX mode described herein may be associated with the UE receiving new TBs subject to a constraint, such as a constraint that a new TB be included in a same slot as the indicated resources, or a constraint that the new TB be included in a gap with a resource reserved for retransmission.

By configuring and using the different modes, versatility of power management and sidelink communication performance are improved. For example, by using the mode in which the UE only performs reception on indicated resources, power can be conserved and lower-capability UEs can be supported. As another example, by using the mode in which the UE can perform reception of TBs other than TBs associated with indicated resources, performance in certain use cases, such as extended reality (XR), may be improved.

As indicated above, FIG. 5 is provided as an example. Other examples may differ from what is described with respect to FIG. 5.

Figure 6:
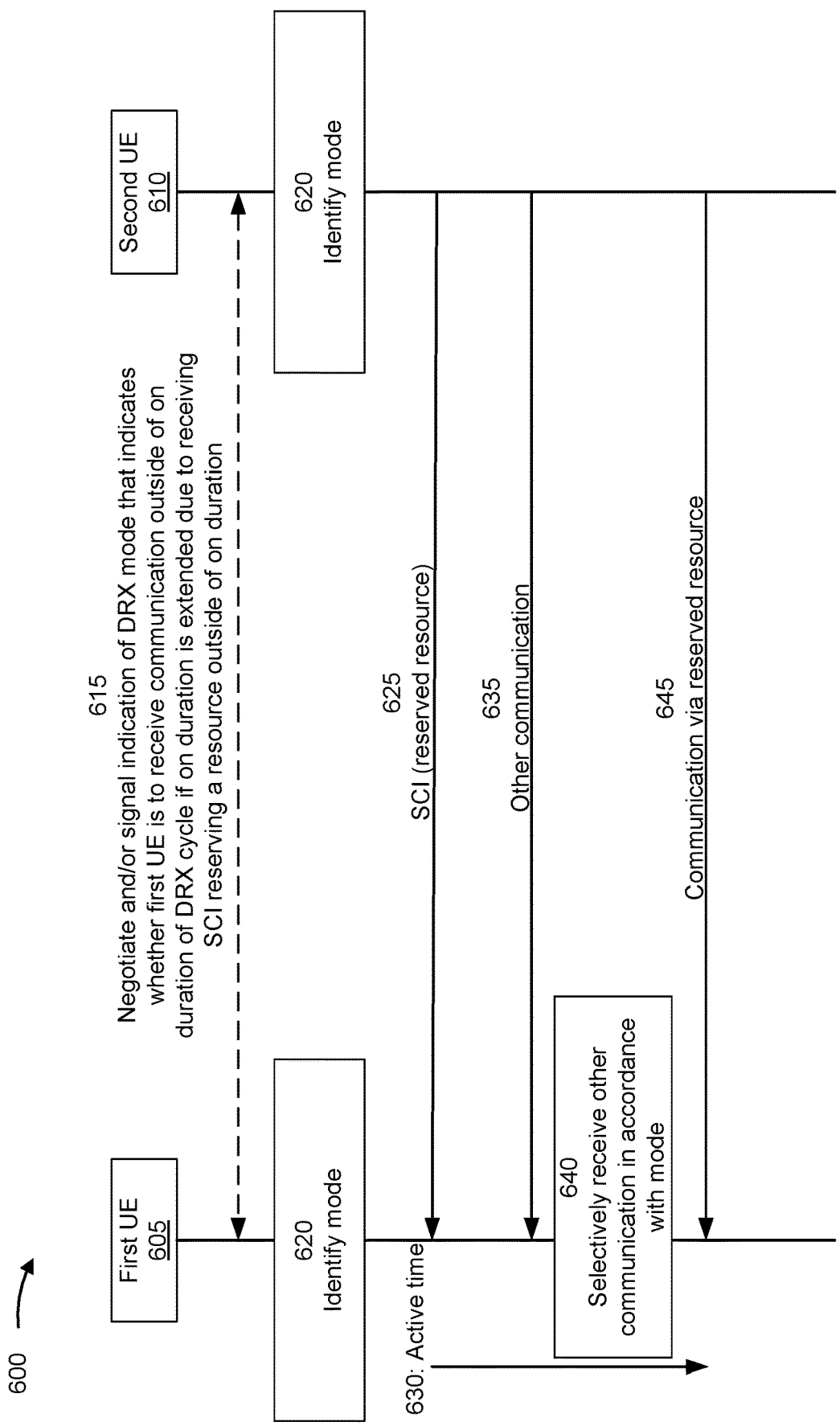

FIG. 6 is a diagram illustrating an example 600 associated with power consumption mitigation under DRX, in accordance with the present disclosure. As shown in FIG. 6, example 600 includes communication between a first UE 605 and a second UE 610. In some aspects, the first UE 605 and the second UE 610 may be included in a wireless network, such as wireless network 100. The first UE 605 and the second UE 610 may communicate via a sidelink connection, as described herein.

In some aspects, the first UE 605 and the second UE 610 may support sidelink DRX. The first UE 605 may configure a DRX cycle of the first UE 605 for a sidelink connection with the second UE 610 (not shown). The first UE 605 may provide information indicating the DRX cycle of the first UE 605 to the second UE 610. Additionally, or alternatively, the second UE 610 may configure the DRX cycle of the first UE 605, and may thus have information indicating the DRX cycle of the first UE 605. Additionally, or alternatively, a base station may configure the DRX cycle of the first UE 605 and/or the second UE 610.

Example 600 relates to the determination and usage of a DRX mode (sometimes referred to herein as a mode) associated with communications between the first UE 605 and the second UE 610 via the sidelink connection. The DRX mode may specify whether the first UE 605 is to receive a communication outside of an on duration of the DRX cycle if the on duration is extended due to receiving SCI reserving a resource outside of the on duration. For example, the communication may be different than a communication associated with the reserved resource. In other words, the DRX mode may indicate whether the first UE 605 is to monitor for and/or receive TBs (sometimes referred to as new TBs or additional communications) other than a TB scheduled by SCI received during the on duration of the DRX cycle, where the SCI caused the extension of the on duration.

In some aspects, the DRX mode may be a first DRX mode. The first DRX mode may specify that the first UE 605 is not to receive an additional communication outside of an on duration of the DRX cycle if the on duration is extended due to receiving SCI reserving a resource (associated with a scheduled communication) that occurs outside of the on duration.

In some aspects, the DRX mode may be a second DRX mode. The second DRX mode may specify that the first UE 605 is to receive an additional communication outside of an on duration of the DRX cycle if the on duration is extended due to receiving SCI reserving a resource (associated with a scheduled communication) outside of the on duration.

In some aspects, the second DRX mode may specify that the first UE 605 is to receive the additional communication outside of the on duration of the DRX cycle subject to a condition associated with the additional communication. For example, the second DRX mode may be a mode in which the UE is to receive the additional communication outside of the on duration if the on duration is extended due to receiving SCI reserving a resource outside of the on duration subject to a condition associated with the additional communication. In some aspects, the condition may constrain resources of the first UE 605 utilized to receive the additional communication. For example, the condition may constrain the additional communication to be transmitted within a slot in which the re-transmission resources (that is, resources associated with the scheduled communication) are reserved and indicated. As another example, the condition may constrain the additional communication to be transmitted within a slot that is between two slots in which the re-transmission resources are reserved. As another example, the condition may constrain the additional communication to only a portion of the bandwidth of a resource pool. By constraining the resources of the first UE 605 utilized to receive the additional communication in this way, the quantity of subchannels monitored by the first UE 605 may be limited. For example, under this mode of operation the first UE 605 does not need to monitor all of the subchannels to receive the additional communication. Rather, the first UE 605 can monitor only a subset (e.g., a proper subset) of the subchannels on which condition constrains the additional communication is to be transmitted. In some aspects, the condition may indicate that the communication is to be received if a remaining packet delay budget of the communication is less than a time gap to a next on duration. Thus, the condition may ensure that a communication that would be dropped due to the remaining packet delay budget can be communicated, thereby reducing the occurrence of dropped communications. In some aspects, when not performing reception on the reserved resources or in a same slot as a reserved resource, the first UE 605 may enter an inactive state during the extended active time. For example, under this mode of operation, the first UE 605 does not need to be awake in all slots. Rather, the first UE 605 can receive new TBs, and can go to sleep in other slots during the time that the inactivity timer is running.

In some aspects, the condition is based at least in part on a priority associated with the communication. For example, the condition may indicate that the first UE 605 is to receive the communication outside of the on duration when the communication is associated with a first priority (e.g., a high priority, a priority that satisfies a threshold) and/or that the first UE 605 is not to receive the communication outside of the on duration when the communication is associated with a second priority (e.g., a lower priority relative to the first priority, a priority that fails to satisfy a threshold).

In some aspects, the DRX mode is a third DRX mode. The third DRX mode may specify that the first UE 605 is to receive the additional communication outside of the on duration of the DRX cycle if the first UE 605 receives an indication that the second UE 610 intends to transmit new TBs (that is, an additional communication) to the first UE 605 outside of the on duration of the DRX cycle. This may be considered a dynamic indication, as described in more detail elsewhere herein.

As shown by reference number 615, in some aspects (optionally, as indicated by the dashed line), the first UE 605 and the second UE 610 may negotiate the DRX mode and/or may signal an indication of the DRX mode. In some aspects, the first UE 605 may signal an indication of the DRX mode to the second UE 610. For example, the first UE 605 may identify a DRX mode from a group of one or more DRX modes supported by the first UE 605 and may provide information indicating the DRX mode to the second UE 610. In some other aspects, the second UE 610 may identify the DRX mode and may signal information indicating the DRX mode to the first UE 605, as described elsewhere herein.

In some aspects, the first UE 605 may identify the DRX mode based at least in part on configuration information associated with the first UE 605. In some aspects, the configuration information may be associated with a resource pool associated with the first UE 605, a bandwidth part associated with the first UE 605, a component carrier associated with the first UE 605, or the like. For example, configuration information for a resource pool, bandwidth part, or component carrier may carry an indication of a DRX mode to use. Alternatively, and/or additionally, the first UE 605 may identify the DRX mode based at least in part on a pre-configuration of the first UE 605. The pre-configuration may be associated with a resource pool associated with the first UE 605, a bandwidth part associated with the first UE 605, a component carrier associated with the first UE 605, or the like. For example, some resource pools, bandwidth parts, or component carriers may be pre-configured to use one DRX mode, while other resource pools, bandwidth parts, or component carriers may be pre-configured to use another DRX mode.

In some aspects, the DRX mode may be based at least in part on a capability of the first UE 605. For example, a lower capability UE may use the first DRX mode, whereas a higher capability UE may use the second DRX mode or the third DRX mode.

In some aspects, the first UE 605 and the second UE 610 may negotiate the DRX mode based at least in part on the DRX mode signaled by the first UE 605. The first UE 605 may provide, to the second UE 610, information identifying one or more DRX modes supported by the first UE 605, a DRX mode selected by the first UE 605, or the like. The second UE 610 may select a DRX mode based at least in part on the information provided by the first UE 605. The second UE 610 may provide information identifying the selected DRX mode to the first UE 605. This signaling may occur, for example, via a radio resource control (RRC) interface, such as a PC5-RRC interface.

In some aspects, the first UE 605 may transmit, to the second UE 610, a request for a selected DRX mode. For example, the first UE 605 may select a DRX mode based at least in part on a group of DRX modes supported by the second UE 610, a status of a battery of the first UE 605 or the second UE 610, a capability of the first UE 605, or the like. The first UE 605 may receive, from the second UE 610 and based at least in part on the request, information indicating whether the DRX mode selected by the first UE 605 is to be used as the DRX mode.

In some aspects, the second UE 610 may signal an indication of the DRX mode to the first UE 605. The second UE 610 may identify a DRX mode from a group of one or more DRX modes supported by the second UE 610 and may provide information indicating the DRX mode to the first UE 605. In some aspects, the second UE 610 provides the information indicating the DRX mode to the first UE 605 via configuration information provided to the first UE 605 by the second UE 610. The configuration information may be associated with a resource pool, a bandwidth part, a component carrier, or the like associated with sidelink communications between the first UE 605 and the second UE 610.

In some aspects, the configuration information may identify multiple DRX modes supported by the second UE 610. The first UE 605 may select the DRX mode from the multiple DRX modes supported by the second UE 610. The first UE 605 may transmit to the second UE 610 information indicating the selected DRX mode.

As shown by reference number 620, the first UE 605 and the second UE 610 identify the DRX mode. In some aspects, the first UE 605 and the second UE 610 may identify the DRX mode based at least in part on the negotiation and/or the indication of the DRX mode. The first UE 605 and the second UE 610 may communicate in accordance with the DRX mode, as described below.

As shown by reference number 625, the first UE 605 receives SCI reserving resources outside of an on duration of the DRX cycle from the second UE 610. As just one example, the SCI may reserve resources for multiple retransmissions of a TB, where one or more of the retransmissions occur outside of the on duration. As shown by reference number 630, the first UE 605 may extend the on duration based at least in part on the SCI reserving resources outside of the on duration of the DRX cycle. Thus, the active time may encompass the original on duration, as well as the extension to the on duration in accordance with the first UE 605's inactivity timer, which enables the first UE 605 to receive communications on all of the reserved resources.

In some aspects, such as when operating in the third DRX mode, the first UE 605 may receive, from the second UE 610, an indication (e.g., a dynamic indication) of whether the second UE 610 will transmit another communication (e.g., other than the communication associated with the reserved resources) outside of the on duration. When the dynamic indication indicates that the second UE 610 will transmit another communication outside of the on duration, in some aspects, the first UE 605 may monitor all subchannels in all slots during the extended active time (e.g., during a time period in which an inactivity timer is running). In some other aspects, if the dynamic indication indicates that the second UE will transmit another communication outside of the on duration, the first UE 605 may monitor a subset of subchannels and/or slots, such as subchannels and/or slots associated with the reserved resources. When the dynamic indication indicates that the second UE 610 will not transmit a communication outside of the on duration, the first UE 605 may only perform reception on the reserved resources during the extended active time. In some aspects, when not performing reception on the reserved resources, the first UE 605 may enter an inactive state during the extended active time. For example, the first UE 605 may receive the additional communication outside of the on duration of the DRX cycle subject to a condition that constrains resources of the first UE 605 utilized to receive the additional communication. For example, the condition may constrain the additional communication to be transmitted within a slot in which the re-transmission resources (that is, resources associated with the scheduled communication) are reserved and indicated, as described elsewhere herein. Under this mode of operation, the first UE 605 does not need to be awake in all slots. Rather, the first UE 605 can receive new TBs, and can go to sleep in other slots during the time that the inactivity timer is running.

In some aspects, the dynamic indication may be received via the SCI. As an example, the second UE 610 may transmit an SCI reserving resources outside of the DRX on duration (which may trigger the inactivity timer of the first UE 605). The second UE 610 may use a field in SCI-1 or SCI-2 to indicate whether the second UE 610 will transmit a communication outside of the on duration of the DRX cycle.

In some aspects, the dynamic indication may be received via MAC signaling in a sidelink data channel. As an example, the second UE 610 may transmit an SCI reserving resources outside of the DRX on duration (which may trigger the inactivity timer of the first UE 605). The second UE 610 may utilize a portion of a PSSCH medium access control control element (MAC-CE) to indicate whether the second UE 610 will transmit a communication outside of the on duration of the DRX cycle.

As shown by reference numbers 635, the second UE 610 provides the other communication to the first UE 605. As shown by reference number 640, the first UE 605 selectively receives the other communication in accordance with the DRX mode. In some aspects, the DRX mode indicates that the first UE 605 is not to receive a communication outside of the on duration of the DRX cycle if the on duration is extended due to the first UE 605 receiving the SCI reserving a resource outside of the on duration. The first UE 605 may not receive the other communication from the second UE 610 based at least in part on the DRX mode.

In some aspects, the DRX mode indicates that the first UE 605 is to receive a communication outside of the on duration of the DRX cycle if the on duration is extended due to the first UE 605 receiving the SCI reserving a resource outside of the on duration. The first UE 605 may receive the other communication from the second UE 610 based at least in part on the DRX mode. In some aspects, the dynamic indication identifies a portion of the bandwidth of the resource pool associated with the other communication. The first UE 605 may monitor the identified portion of the bandwidth (e.g., rather than monitoring all subchannels) during the extension of the on duration to receive the other communication.

In some aspects, the DRX mode indicates that the first UE 605 is to receive a communication outside of the on duration of the DRX cycle if the on duration is extended due to the first UE 605 receiving the SCI reserving a resource outside of the on duration and if a condition associated with the transmission of the communication is satisfied. In some aspects, the condition may constrain resources of the first UE 605 utilized to receive the communication. For example, the condition may constrain the other communication to be transmitted within a slot in which the re-transmission resources are reserved and indicated, within a slot that is between two slots in which the retransmission resources are reserved, within a slot that is a quantity of slots prior to a slot in which the retransmission resources are reserved, within a slot that is a quantity of slots subsequent to a slot in which the retransmission resources are reserved, or the like. The first UE 605 may receive the other communication when the communication is transmitted within the slot in which the re-transmission resources are reserved, within a slot that is between two slots in which the retransmission resources are reserved, within a slot that is a quantity of slots prior to a slot in which the retransmission resources are reserved, within a slot that is a quantity of slots subsequent to a slot in which the retransmission resources are reserved, or the like.

In some aspects, the condition may indicate that the other communication is to be received if a remaining packet delay budget of the other communication is less than a time gap to a next on duration. The first UE 605 may receive the other communication when the remaining packet delay budget of the other communication is less than the time gap to the next on duration of the DRX cycle.

In some aspects, the condition is based at least in part on a priority associated with the communication. For example, the condition may indicate that the first UE 605 is to receive the other communication outside of the on duration when the other communication is associated with a first priority and/or that the first UE 605 is not to receive the other communication outside of the on duration when the communication is associated with a second priority. The first UE 605 may receive the other communication when the other communication is associated with the first priority. The first UE 605 may not receive the other communication when the other communication is associated with the second priority.

As shown by reference number 645, the first UE 605 receives the communication (e.g., the scheduled communication) via the reserved resource. The first UE 605 may receive the communication via the reserved resource based at least in part on extending the on duration of the DRX cycle.

In some aspects, the first UE 605 monitors a remaining portion of resources reserved for the other communication. In some aspects, the first UE 605 monitors the remaining portion of the resources reserved for the other communication based on a type of HARQ process associated with the other communication. In some aspects, the other communication may not be associated with a HARQ process. The first UE 605 may monitor the remaining portion of the resources reserved for the other communication based at least in part on the other communication not being associated with a HARQ process.

In some aspects, the other communication may be associated with a first type of HARQ process. The first type of HARQ process may indicate that the first UE 605 does not need to monitor the remaining portion of the resources reserved for the other communication when a TB associated with the other communication is successfully decoded and/or when a positive acknowledgement (e.g., an ACK) associated with the other communication is transmitted to the second UE 610. The first UE 605 may not monitor the remaining portion of the resources reserved for the other communication based at least in part on successfully decoding a TB associated with the other communication and/or transmitting a positive acknowledgement associated with the other communication to the second UE 610.

In some aspects, the other communication may be associated with a second type of HARQ process. The second type of HARQ process may indicate that the first UE 605 is to monitor the remaining portion of the resources reserved for the other communication. The first UE 605 may monitor the remaining portion of the resources reserved for the other communication based at least in part on the other communication being associated with the second type of HARQ process.

In some aspects, the other communication reserves another resource outside of the on duration for transmission of an additional communication. For example, the other communication may reserve another resource outside of the on duration of the DRX cycle for retransmission of the other communication. The first UE 605 may further extend the on duration to receive the additional communication in a manner similar to that described elsewhere herein.

By configuring and using the different modes, versatility of power management and sidelink communication performance are improved. For example, by using the mode in which the UE only performs reception on indicated resources, power can be conserved and lower-capability UEs can be supported. As another example, by using the mode in which the UE can perform reception of TBs other than TBs associated with indicated resources, performance in certain use cases, such as XR, may be improved.

As indicated above, FIG. 6 is provided as an example. Other examples may differ from what is described with respect to FIG. 6.

Figure 7:
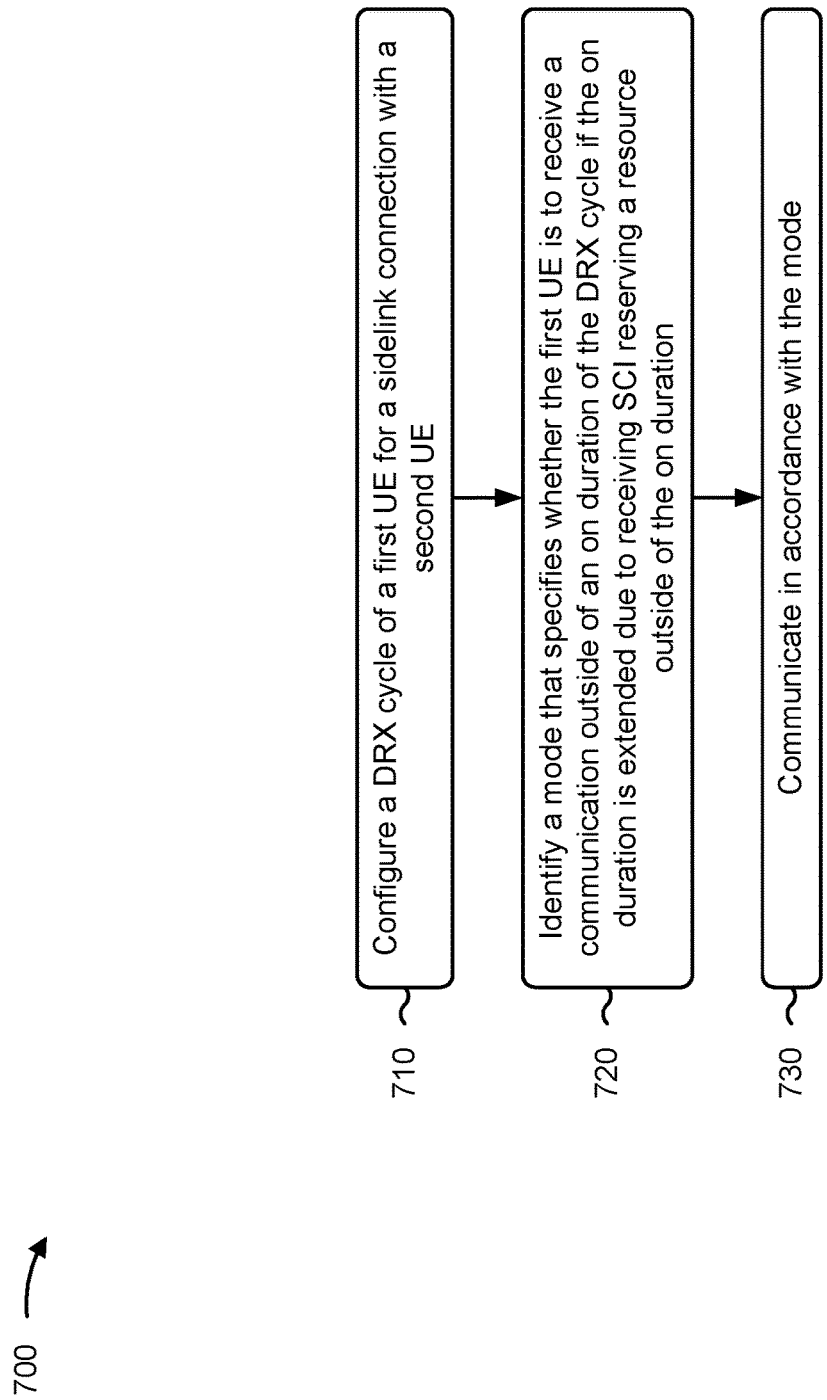
FIGS. 7 and 8 are diagrams illustrating example processes associated with power consumption optimization under discontinuous reception, in accordance with the present disclosure.

FIG. 7 is a diagram illustrating an example process 700 performed, for example, by a UE, in accordance with the present disclosure. Example process 700 is an example where a first UE (e.g., UE 120, UE 305, UE 405, first UE 605) performs operations associated with power consumption optimization under DRX.

As shown in FIG. 7, in some aspects, process 700 may include configuring a DRX cycle of the first UE for a sidelink connection with a second UE (block 710). For example, the first UE (e.g., using communication manager 140 and/or configuration component 908, depicted in FIG. 9) may configure a DRX cycle of the first UE for a sidelink connection with a second UE (e.g., second UE 610), as described above.

As further shown in FIG. 7, in some aspects, process 700 may include identifying a mode that specifies whether the first UE is to receive a communication outside of an on duration of the DRX cycle if the on duration is extended due to receiving SCI reserving a resource outside of the on duration (block 720). For example, the first UE (e.g., using communication manager 140 and/or identification component 910, depicted in FIG. 9) may identify a mode (sometimes referred to herein as a DRX mode) that specifies whether the first UE is to receive a communication outside of an on duration of the DRX cycle if the on duration is extended due to receiving SCI reserving a resource outside of the on duration, as described above. For example, the communication is sometimes referred to herein as an additional communication or a new TB, and the SCI may reserve a resource for a communication referred to herein as a scheduled communication.

As further shown in FIG. 7, in some aspects, process 700 may include communicating in accordance with the mode (block 730). For example, the first UE (e.g., using communication manager 140 and/or reception component 902 and/or transmission component 904, depicted in FIG. 9) may communicate in accordance with the mode, as described above.

Process 700 may include additional aspects, such as any single aspect or any combination of aspects described below and/or in connection with one or more other processes described elsewhere herein.

In a first aspect, the communication is scheduled by a transmission other than the SCI reserving the resource outside of the on duration. For example, the communication may be scheduled by additional SCI other than the SCI reserving the resource. In some aspects, the additional SCI may be received in an extended part of the on duration.

In a second aspect, alone or in combination with the first aspect, the mode indicates that the first UE is to receive a communication outside of an on duration of the DRX cycle if the on duration is extended due to the first UE receiving SCI reserving a resource outside of the on duration, and wherein communicating in accordance with the mode further comprises receiving the communication during an active time.

In a third aspect, alone or in combination with one or more of the first and second aspects, process 700 includes receiving the SCI during the on duration, and extending the on duration in accordance with the SCI.

In a fourth aspect, alone or in combination with one or more of the first through third aspects, identifying the mode further comprises receiving configuration information identifying the mode, wherein the configuration information is for at least one of a resource pool, a bandwidth part, or a component carrier.

In a fifth aspect, alone or in combination with one or more of the first through fourth aspects, the configuration information indicates multiple supported modes, and wherein identifying the mode further comprises selecting the mode from the multiple supported modes.

In a sixth aspect, alone or in combination with one or more of the first through fifth aspects, identifying the mode is based at least in part on a pre-configuration of the first UE, wherein the pre-configuration is for at least one of a resource pool, a bandwidth part, or a component carrier.

In a seventh aspect, alone or in combination with one or more of the first through sixth aspects, identifying the mode further comprises negotiating the mode with the second UE.

In an eighth aspect, alone or in combination with one or more of the first through seventh aspects, process 700 includes transmitting, to the second UE, information indicating the mode.

In a ninth aspect, alone or in combination with one or more of the first through eighth aspects, identifying the mode further comprises receiving, from the second UE, information indicating the mode.

In a tenth aspect, alone or in combination with one or more of the first through ninth aspects, process 700 includes transmitting, to the second UE, a request for a selected mode, wherein identifying the mode further comprises receiving, from the second UE, information indicating whether the selected mode should be used as the mode.

In an eleventh aspect, alone or in combination with one or more of the first through tenth aspects, identifying the mode further comprises receiving, from the second UE, an indication of whether the second UE will transmit the communication outside of the on duration.

In a twelfth aspect, alone or in combination with one or more of the first through eleventh aspects, the indication is a dynamic indication.

In a thirteenth aspect, alone or in combination with one or more of the first through twelfth aspects, the indication is received via the SCI.

In a fourteenth aspect, alone or in combination with one or more of the first through thirteenth aspects, the indication is received via medium access control signaling in a sidelink data channel.

In a fifteenth aspect, alone or in combination with one or more of the first through fourteenth aspects, the mode indicates that the first UE is to receive the communication outside of an on duration of the DRX cycle subject to a condition associated with the communication.

In a sixteenth aspect, alone or in combination with one or more of the first through fifteenth aspects, the condition indicates that the communication is to be received if the communication is included in a slot or a gap associated with a retransmission resource.

In a seventeenth aspect, alone or in combination with one or more of the first through sixteenth aspects, the condition indicates that the communication is to be received if the communication is included in a gap associated with a retransmission resource.

In an eighteenth aspect, alone or in combination with one or more of the first through seventeenth aspects, the condition indicates that the communication is to be received if a remaining packet delay budget of the communication is less than a time gap to a next on duration.

In a nineteenth aspect, alone or in combination with one or more of the first through eighteenth aspects, the condition is based at least in part on a priority associated with the communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
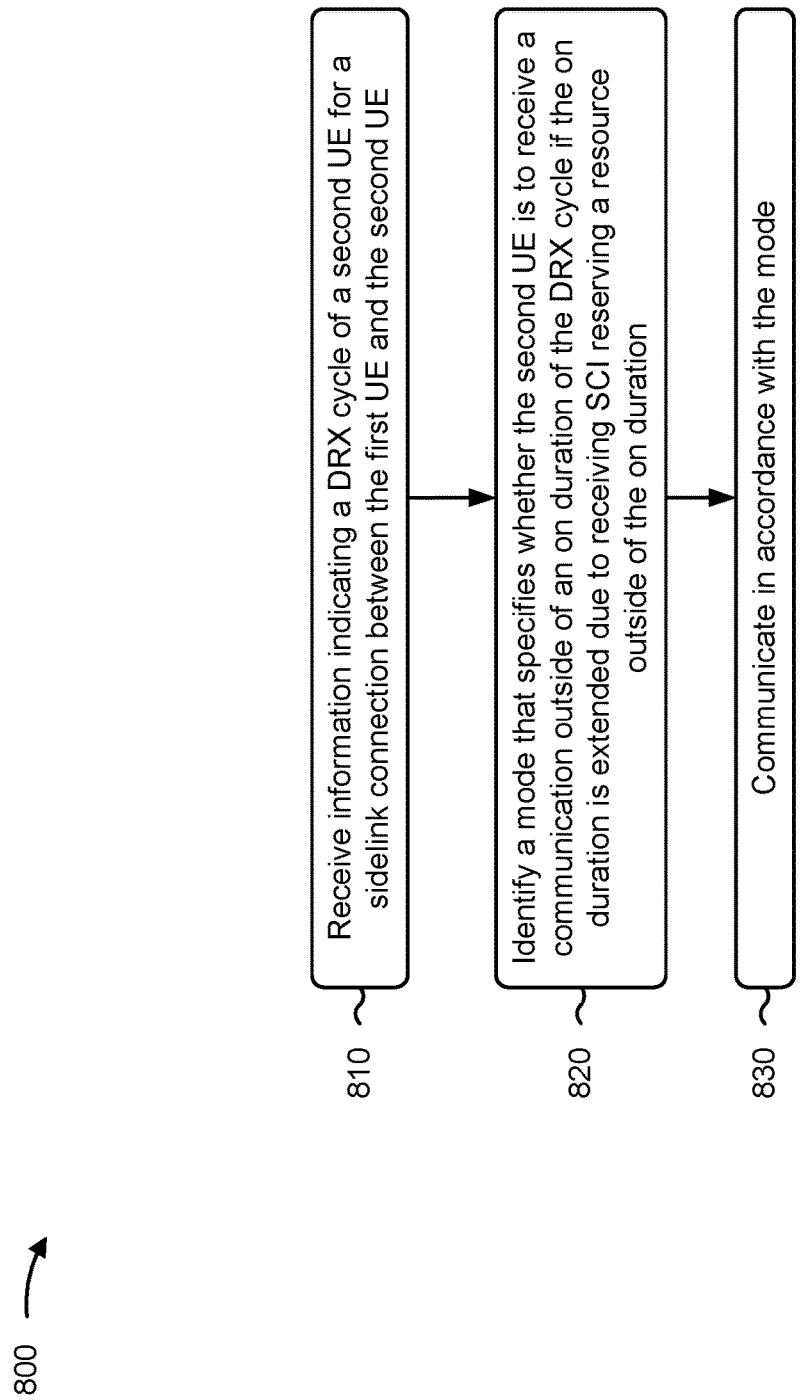

FIG. 8 is a diagram illustrating an example process 800 performed, for example, by a UE, in accordance with the present disclosure. Example process 800 is an example where a first UE (e.g., UE 120, UE 305, UE 405, second UE 610) performs operations associated with power consumption optimization under DRX. It should be noted that example process 800 describes the actions of a UE referred to as a first UE. However, in some examples, the first UE of example process 800 may be the second UE 610 of FIG. 6.

As shown in FIG. 8, in some aspects, process 800 may include receiving information indicating a DRX cycle of a second UE for a sidelink connection between the first UE and the second UE (block 810). For example, the first UE (e.g., using communication manager 140 and/or reception component 1002, depicted in FIG. 10) may receive information indicating a DRX cycle of a second UE (e.g., first UE 605) for a sidelink connection between the first UE and the second UE, as described above. In some aspects, the first UE may determine the information indicating the DRX cycle of the second UE. In some other aspects, the first UE may receive the information indicating the DRX cycle of the second UE from the second UE or from a base station.

As further shown in FIG. 8, in some aspects, process 800 may include identifying a mode that specifies whether the second UE is to receive a communication outside of an on duration of the DRX cycle if the on duration is extended due to receiving SCI reserving a resource outside of the on duration (block 820). For example, the UE (e.g., using communication manager 140 and/or identification component 1008, depicted in FIG. 10) may identify a mode that specifies whether the second UE is to receive a communication (which may, in some examples, include a new transport block) outside of an on duration of the DRX cycle if the on duration is extended due to receiving SCI reserving a resource outside of the on duration, as described above.

As further shown in FIG. 8, in some aspects, process 800 may include communicating in accordance with the mode (block 830). For example, the UE (e.g., using communication manager 140 and/or reception component 1002 and/or transmission component 1004, depicted in FIG. 10) may communicate in accordance with the mode, as described above.

Process 800 may include additional aspects, such as any single aspect or any combination of aspects described below and/or in connection with one or more other processes described elsewhere herein.

In a first aspect, process 800 includes reserving a resource for the communication via a transmission other than the SCI reserving the resource outside of the on duration.

In a second aspect, alone or in combination with the first aspect, the mode indicates that the second UE is to receive a communication outside of an on duration of the DRX cycle if the on duration is extended due to the second UE receiving SCI reserving a resource outside of the on duration, and wherein communicating in accordance with the mode further comprises transmitting the communication during an active time of the second UE.

In a third aspect, alone or in combination with one or more of the first and second aspects, process 800 includes transmitting the SCI during the on duration, wherein the on duration is extended in accordance with the SCI.

In a fourth aspect, alone or in combination with one or more of the first through third aspects, identifying the mode further comprises receiving configuration information identifying the mode, wherein the configuration information is for at least one of a resource pool, a bandwidth part, or a component carrier.

In a fifth aspect, alone or in combination with one or more of the first through fourth aspects, the configuration information indicates multiple supported modes, and wherein identifying the mode further comprises selecting the mode from the multiple supported modes.

In a sixth aspect, alone or in combination with one or more of the first through fifth aspects, identifying the mode is based at least in part on a pre-configuration of the first UE, wherein the pre-configuration is for at least one of a resource pool, a bandwidth part, or a component carrier.

In a seventh aspect, alone or in combination with one or more of the first through sixth aspects, identifying the mode further comprises negotiating the mode with the second UE.

In an eighth aspect, alone or in combination with one or more of the first through seventh aspects, process 800 includes transmitting, to the second UE, information indicating the mode.

In a ninth aspect, alone or in combination with one or more of the first through eighth aspects, identifying the mode further comprises receiving, from the second UE, information indicating the mode.

In a tenth aspect, alone or in combination with one or more of the first through ninth aspects, process 800 includes from, to the second UE, a request for a selected mode, wherein identifying the mode further comprises transmitting, to the second UE, information indicating whether the selected mode should be used as the mode.

In an eleventh aspect, alone or in combination with one or more of the first through tenth aspects, process 800 includes transmitting, to the second UE, an indication of whether the first UE will transmit the communication outside of the on duration.

In a twelfth aspect, alone or in combination with one or more of the first through eleventh aspects, the indication is a dynamic indication.

In a thirteenth aspect, alone or in combination with one or more of the first through twelfth aspects, the indication is transmitted via the SCI.

In a fourteenth aspect, alone or in combination with one or more of the first through thirteenth aspects, the indication is transmitted via medium access control signaling in a sidelink data channel.

In a fifteenth aspect, alone or in combination with one or more of the first through fourteenth aspects, the mode indicates that the second UE is to receive the communication outside of an on duration of the DRX cycle subject to a condition associated with the communication.

In a sixteenth aspect, alone or in combination with one or more of the first through fifteenth aspects, the condition indicates that the communication is to be received if the communication is included in a slot or a gap associated with a retransmission resource.

In a seventeenth aspect, alone or in combination with one or more of the first through sixteenth aspects, the condition constrains the communication to a portion of bandwidth of a resource pool.

In an eighteenth aspect, alone or in combination with one or more of the first through seventeenth aspects, the condition indicates that the communication is to be received if the communication is included in a gap associated with a retransmission resource.

In an nineteenth aspect, alone or in combination with one or more of the first through eighteenth aspects, the condition indicates that the communication is to be received if a remaining packet delay budget of the communication is less than a time gap to a next on duration.

In a twentieth aspect, alone or in combination with one or more of the first through nineteenth aspects, the condition is based at least in part on a priority associated with the communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
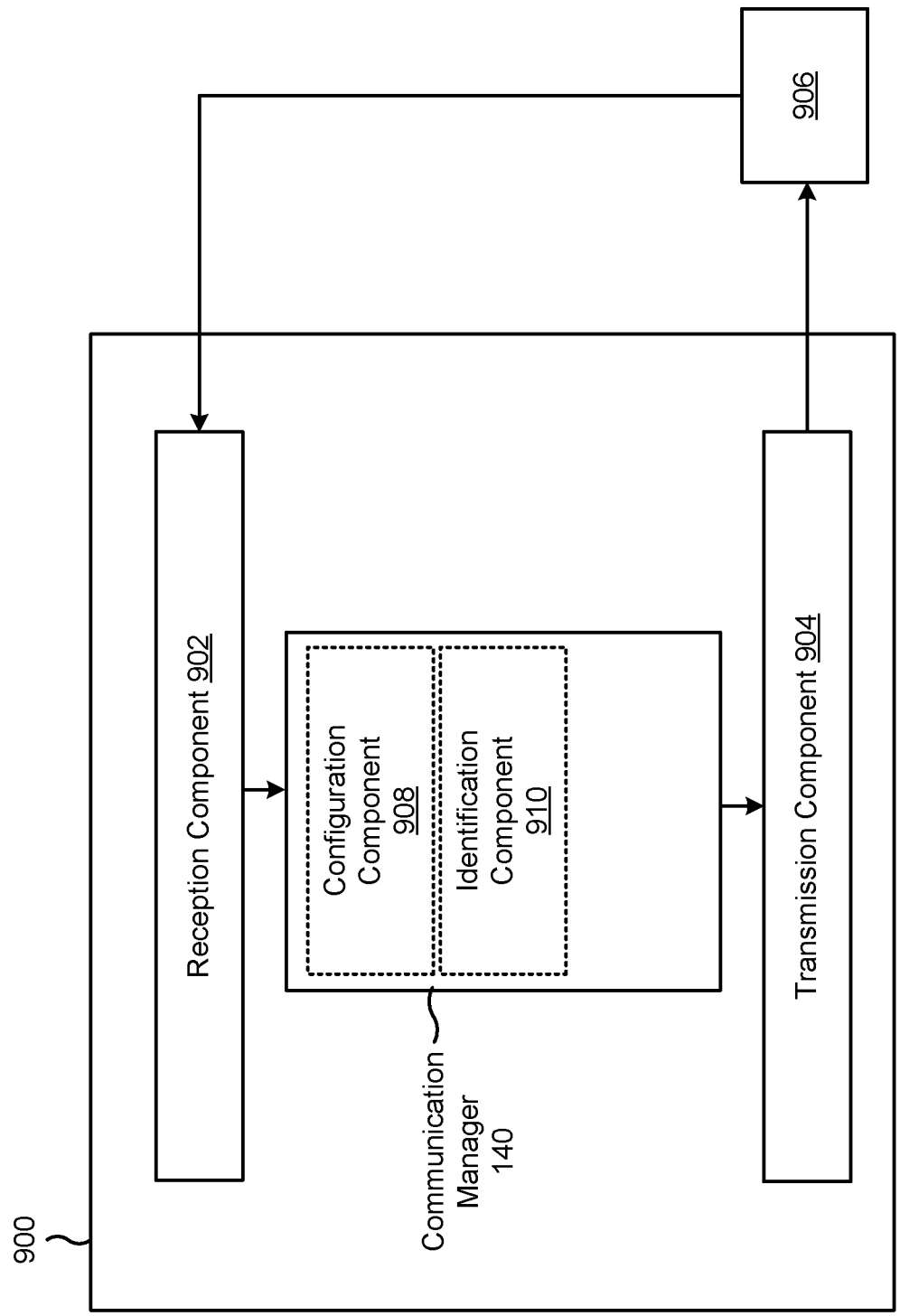
FIGS. 9 and 10 are block diagrams of example apparatuses for wireless communication, in accordance with the present disclosure.

FIG. 9 is a block diagram of an example apparatus 900 for wireless communication. The apparatus 900 may be a first UE, or a first UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a configuration component 908 or an identification component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the first UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the first UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the first UE described above in connection with FIG. 2. In some aspects, the transmission component 904 may be co-located with the reception component 902 in a transceiver.

The configuration component 908 may configure a DRX cycle of the first UE for a sidelink connection with a second UE. The identification component 910 may identify a mode that specifies whether the first UE is to receive a communication outside of an on duration of the DRX cycle if the on duration is extended due to receiving SCI reserving a resource outside of the on duration. The reception component 902 and/or the transmission component 904 may communicate in accordance with the mode.

The reception component 902 may receive the SCI during the on duration.

The configuration component 908 may extend the on duration in accordance with the SCI.

The transmission component 904 may transmit, to the second UE, information indicating the mode.

The transmission component 904 may transmit, to the second UE, a request for a selected mode, wherein identifying the mode further comprises.

The reception component 902 may receive, from the second UE, information indicating whether the selected mode should be used as the mode.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
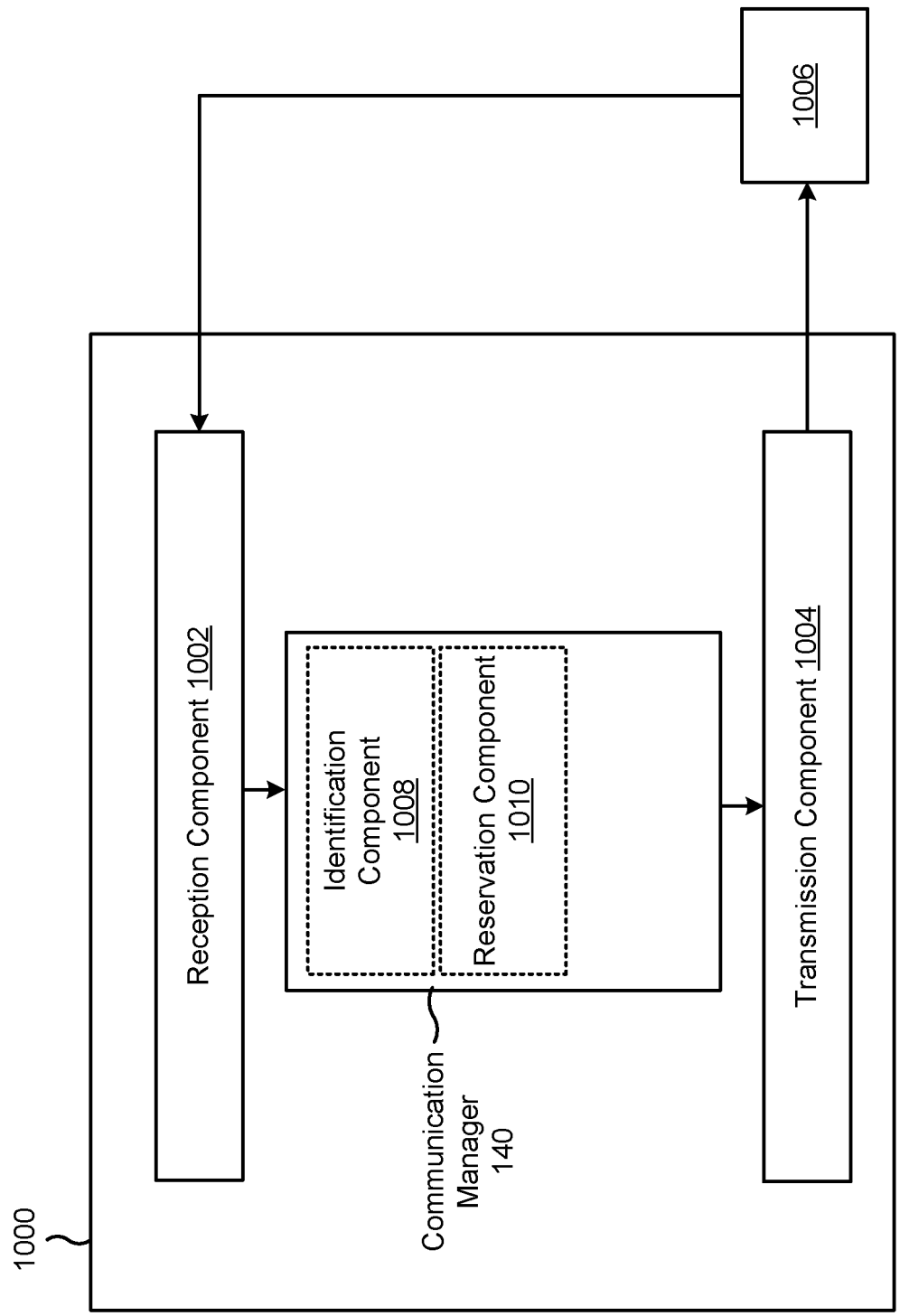

FIG. 10 is a block diagram of an example apparatus 1000 for wireless communication. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an identification component 1008 or a reservation component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the first UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the first UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the first UE described above in connection with FIG. 2. In some aspects, the transmission component 1004 may be co-located with the reception component 1002 in a transceiver.

The reception component 1002 may receive information indicating a DRX cycle of a second UE for a sidelink connection between the first UE and the second UE. The identification component 1008 may identify a mode that specifies whether the second UE is to receive a communication outside of an on duration of the DRX cycle if the on duration is extended due to receiving SCI reserving a resource outside of the on duration. The reception component 1002 and/or the transmission component 1004 may communicate in accordance with the mode.

The reservation component 1010 may reserve a resource for the communication via a transmission other than the SCI reserving the resource outside of the on duration.

The transmission component 1004 may transmit the SCI during the on duration, wherein the on duration is extended in accordance with the SCI.

The transmission component 1004 may transmit, to the second UE, information indicating the mode.

The transmission component 1004 may transmit, to the second UE, an indication of whether the first UE will transmit the communication outside of the on duration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first UE, comprising: configuring a DRX cycle of the first UE for a sidelink connection with a second UE; identifying a mode that specifies whether the first UE is to receive a communication outside of an on duration of the DRX cycle if the on duration is extended due to receiving SCI reserving a resource outside of the on duration; and communicating in accordance with the mode.

Aspect 2: The method of Aspect 1, wherein the communication is scheduled by a transmission other than the SCI reserving the resource outside of the on duration.

Aspect 3: The method of one or more of Aspects 1 and 2, wherein the mode indicates that the first UE is to receive a communication outside of an on duration of the DRX cycle if the on duration is extended due to the first UE receiving SCI reserving a resource outside of the on duration, and wherein communicating in accordance with the mode further comprises: receiving the communication during an active time.

Aspect 4: The method of one or more of Aspects 1 through 3, further comprising: receiving the SCI during the on duration; and extending the on duration in accordance with the SCI.

Aspect 5: The method of one or more of Aspects 1 through 4, wherein identifying the mode further comprises: receiving configuration information identifying the mode, wherein the configuration information is for at least one of: a resource pool, a bandwidth part, or a component carrier.

Aspect 6: The method of Aspect 5, wherein the configuration information indicates multiple supported modes, and wherein identifying the mode further comprises selecting the mode from the multiple supported modes.

Aspect 7: The method of one or more of Aspects 1 through 6, wherein identifying the mode is based at least in part on a pre-configuration of the first UE, wherein the pre-configuration is for at least one of: a resource pool, a bandwidth part, or a component carrier.

Aspect 8: The method of one or more of Aspects 1 through 7, wherein identifying the mode further comprises: negotiating the mode with the second UE.

Aspect 9: The method of one or more of Aspects 1 through 8, further comprising: transmitting, to the second UE, information indicating the mode.

Aspect 10: The method of one or more of Aspects 1 through 9, wherein identifying the mode further comprises: receiving, from the second UE, information indicating the mode.

Aspect 11: The method of one or more of Aspects 1 through 10, further comprising: transmitting, to the second UE, a request for a selected mode, wherein identifying the mode further comprises: receiving, from the second UE, information indicating whether the selected mode should be used as the mode.

Aspect 12: The method of one or more of Aspects 1 through 11, wherein identifying the mode further comprises: receiving, from the second UE, an indication of whether the second UE will transmit the communication outside of the on duration.

Aspect 13: The method of Aspect 12, wherein the indication is a dynamic indication.

Aspect 14: The method of Aspect 12, wherein the indication is received via the SCI.

Aspect 15: The method of Aspect 12, wherein the indication is received via medium access control signaling in a sidelink data channel.

Aspect 16: The method of one or more of Aspects 1 through 15, wherein the mode indicates that the first UE is to receive the communication outside of an on duration of the DRX cycle subject to a condition associated with the communication.

Aspect 17: The method of Aspect 16, wherein the condition indicates that the communication is to be received if the communication is included in a slot or a gap associated with a retransmission resource.

Aspect 18: The method of Aspect 16, wherein the condition indicates that the communication is to be received if the communication is included in a gap associated with a retransmission resource.

Aspect 19: The method of Aspect 16, wherein the condition constrains the communication to a portion of bandwidth of a resource pool.

Aspect 20: The method of Aspect 16, wherein the condition indicates that the communication is to be received if a remaining packet delay budget of the communication is less than a time gap to a next on duration.

Aspect 21: The method of Aspect 16, wherein the condition is based at least in part on a priority associated with the communication.

Aspect 22: A method of wireless communication performed by a first UE, comprising: receiving information indicating a DRX cycle of a second UE for a sidelink connection between the first UE and the second UE; identifying a mode that specifies whether the second UE is to receive a communication outside of an on duration of the DRX cycle if the on duration is extended due to receiving SCI reserving a resource outside of the on duration; and communicating in accordance with the mode.

Aspect 23: The method of Aspect 22, further comprising: reserving a resource for the communication via a transmission other than the SCI reserving the resource outside of the on duration.

Aspect 24: The method of one or more of Aspects 22 and 23, wherein the mode indicates that the second UE is to receive a communication outside of an on duration of the DRX cycle if the on duration is extended due to the second UE receiving SCI reserving a resource outside of the on duration, and wherein communicating in accordance with the mode further comprises: transmitting the communication during an active time of the second UE.

Aspect 25: The method of one or more of Aspects 22 through 24, further comprising: transmitting the SCI during the on duration, wherein the on duration is extended in accordance with the SCI.

Aspect 26: The method of one or more of Aspects 22 through 25, wherein identifying the mode further comprises: receiving configuration information identifying the mode, wherein the configuration information is for at least one of: a resource pool, a bandwidth part, or a component carrier.

Aspect 27: The method of Aspect 26, wherein the configuration information indicates multiple supported modes, and wherein identifying the mode further comprises: selecting the mode from the multiple supported modes.

Aspect 28: The method of one or more of Aspects 22 through 27, wherein identifying the mode is based at least in part on a pre-configuration of the first UE, wherein the pre-configuration is for at least one of: a resource pool, a bandwidth part, or a component carrier.

Aspect 29: The method of one or more of Aspects 22 through 28, wherein identifying the mode further comprises: negotiating the mode with the second UE.

Aspect 30: The method of one or more of Aspects 22 through 29, further comprising: transmitting, to the second UE, information indicating the mode.

Aspect 31: The method of one or more of Aspects 22 through 30, wherein identifying the mode further comprises: receiving, from the second UE, information indicating the mode.

Aspect 32: The method of one or more of Aspects 22 through 31, further comprising: receiving from, the second UE, a request for a selected mode, wherein identifying the mode further comprises: transmitting, to the second UE, information indicating whether the selected mode should be used as the mode.

Aspect 33: The method of one or more of Aspects 22 through 32, further comprising: transmitting, to the second UE, an indication of whether the first UE will transmit the communication outside of the on duration.

Aspect 34: The method of Aspect 33, wherein the indication is a dynamic indication.

Aspect 35: The method of Aspect 33, wherein the indication is transmitted via the SCI.

Aspect 36: The method of Aspect 33, wherein the indication is transmitted via medium access control signaling in a sidelink data channel.

Aspect 37: The method of one or more of Aspects 22 through 36, wherein the mode indicates that the second UE is to receive the communication outside of an on duration of the DRX cycle subject to a condition associated with the communication.

Aspect 38: The method of Aspect 37, wherein the condition indicates that the communication is to be received if the communication is included in a slot or a gap associated with a retransmission resource.

Aspect 39: The method of Aspect 37, wherein the condition constrains the communication to a portion of bandwidth of a resource pool.

Aspect 40: The method of Aspect 37, wherein the condition indicates that the communication is to be received if the communication is included in a gap associated with a retransmission resource.

Aspect 41: The method of Aspect 37, wherein the condition indicates that the communication is to be received if a remaining packet delay budget of the communication is less than a time gap to a next on duration.

Aspect 42: The method of Aspect 37, wherein the condition is based at least in part on a priority associated with the communication.

Aspect 43: The method of any of Aspects 1-21, wherein the mode comprises one of: a mode in which the UE is not to receive the communication outside of the on duration if the on duration is extended due to receiving SCI reserving a resource outside of the on duration, a mode in which the UE is to receive the communication outside of the on duration if the on duration is extended due to receiving SCI reserving a resource outside of the on duration, or a mode in which the UE is to receive the communication outside of the on duration if the on duration is extended due to receiving SCI reserving a resource outside of the on duration subject to a condition associated with the communication.

Aspect 44: The method of any of Aspects 1-21 or 43, wherein the communication includes a new transport block.

Aspect 45: The method of any of Aspects 22-42, wherein the mode comprises one of: a mode in which the UE is not to receive the communication outside of the on duration if the on duration is extended due to receiving SCI reserving a resource outside of the on duration, a mode in which the UE is to receive the communication outside of the on duration if the on duration is extended due to receiving SCI reserving a resource outside of the on duration, or a mode in which the UE is to receive the communication outside of the on duration if the on duration is extended due to receiving SCI reserving a resource outside of the on duration subject to a condition associated with the communication.

Aspect 46: The method of any of Aspects 22-42 or 45, wherein the communication includes a new transport block.

Aspect 47: An apparatus for wireless communication at a device, comprising a processor; memory coupled with the processor; and instructions stored in the memory and executable by the processor to cause the apparatus to perform the method of one or more of Aspects 1 through 21 or 43 through 44.

Aspect 48: A device for wireless communication, comprising a memory and one or more processors coupled to the memory, the one or more processors configured to perform the method of one or more of Aspects of 1 through 21 or 43 through 44.

Aspect 49: An apparatus for wireless communication, comprising at least one means for performing the method of one or more of Aspects 1 through 21 or 43 through 44.

Aspect 50: A non-transitory computer-readable medium storing code for wireless communication, the code comprising instructions executable by a processor to perform the method of one or more of Aspects 1 through 21 or 43 through 44.

Aspect 51: A non-transitory computer-readable medium storing a set of instructions for wireless communication, the set of instructions comprising one or more instructions that, when executed by one or more processors of a device, cause the device to perform the method of one or more of Aspects 1 through 21 or 43 through 44.

Aspect 52: An apparatus for wireless communication at a device, comprising a processor; memory coupled with the processor; and instructions stored in the memory and executable by the processor to cause the apparatus to perform the method of one or more of Aspects 22 through 42 or 45 through 46.

Aspect 53: A device for wireless communication, comprising a memory and one or more processors coupled to the memory, the one or more processors configured to perform the method of one or more of Aspects 22 through 42 or 45 through 46.

Aspect 54: An apparatus for wireless communication, comprising at least one means for performing the method of one or more of Aspects 22 through 42 or 45 through 46.

Aspect 55: A non-transitory computer-readable medium storing code for wireless communication, the code comprising instructions executable by a processor to perform the method of one or more of Aspects 22 through 42 or 45 through 46.

Aspect 56: A non-transitory computer-readable medium storing a set of instructions for wireless communication, the set of instructions comprising one or more instructions that, when executed by one or more processors of a device, cause the device to perform the method of one or more of Aspects 22 through 42 or 45 through 46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, individually or collectively configured to cause the first UE to:
      configure a discontinuous reception (DRX) cycle of the first UE for a sidelink connection with a second UE;
      identify a mode that specifies whether the first UE is to receive a communication outside of an on duration of the DRX cycle if the on duration is extended due to receiving sidelink control information (SCI) reserving a resource outside of the on duration; and
      communicate in accordance with the mode.

2. The apparatus of claim 1, wherein the mode comprises one of:
   a mode in which the first UE is not to receive the communication outside of the on duration if the on duration is extended due to receiving SCI reserving the resource outside of the on duration,
   a mode in which the first UE is to receive the communication outside of the on duration if the on duration is extended due to receiving SCI reserving the resource outside of the on duration, or
   a mode in which the first UE is to receive the communication outside of the on duration if the on duration is extended due to receiving SCI reserving the resource outside of the on duration subject to a condition associated with the communication.

3. The apparatus of claim 1, wherein the communication includes a new transport block.

4. The apparatus of claim 1, wherein the one or more processors, to identify the mode, are individually or collectively configured to cause the first UE to:
   receive configuration information identifying the mode.

5. The apparatus of claim 4, wherein the configuration information is for at least one of:
   a resource pool,
   a bandwidth part, or
   a component carrier.

6. The apparatus of claim 4, wherein the configuration information indicates multiple supported modes, and wherein, to identify the mode, the one or more processors are individually or collectively further configured to cause the first UE to:
   select the mode from the multiple supported modes.

7. The apparatus of claim 1, wherein identifying the mode is based at least in part on a pre-configuration of the first UE, wherein the pre-configuration is for at least one of:
   a resource pool,
   a bandwidth part, or
   a component carrier.

8. The apparatus of claim 1, wherein the one or more processors, to identify the mode, are individually or collectively configured to cause the first UE to:
   negotiate the mode with the second UE.

9. The apparatus of claim 1, wherein the one or more processors are further individually or collectively configured to cause the first UE to:
   transmit, to the second UE, information indicating the mode.

10. The apparatus of claim 1, wherein the one or more processors, to identify the mode, are individually or collectively configured to cause the first UE to:
    receive, from the second UE, information indicating the mode.

11. The apparatus of claim 1, wherein the one or more processors are further individually or collectively configured to cause the first UE to:

transmit, to the second UE, a request for a selected mode, wherein identifying the mode further comprises:
receive, from the second UE, information indicating whether the selected mode should be used as the mode.

12. The apparatus of claim 1, wherein the one or more processors, to identify the mode, are individually or collectively configured to cause the first UE to:
receive, from the second UE, an indication of whether the second UE will transmit the communication outside of the on duration.

13. The apparatus of claim 12, wherein the indication is a dynamic indication.

14. The apparatus of claim 12, wherein the indication is received via the SCI.

15. The apparatus of claim 12, wherein the indication is received via medium access control signaling in a sidelink data channel.

16. The apparatus of claim 1, wherein the one or more processors are further individually or collectively configured to cause the first UE to:
receive the communication outside of an on duration of the DRX cycle subject to a condition associated with the communication.

17. The apparatus of claim 16, wherein the condition indicates that the communication is to be received if the communication is included in a slot or a gap associated with a retransmission resource.

18. The apparatus of claim 16, wherein the condition indicates that the communication is to be received if the communication is included in a gap associated with a retransmission resource.

19. The apparatus of claim 16, wherein the condition constrains the communication to a portion of bandwidth of a resource pool.

20. The apparatus of claim 16, wherein the condition indicates that the communication is to be received if a remaining packet delay budget of the communication is less than a time gap to a next on duration.

21. The apparatus of claim 16, wherein the condition is based at least in part on a priority associated with the communication.

22. An apparatus for wireless communication at a first user equipment (UE), comprising:
one or more memories; and
one or more processors, coupled to the one or more memories, individually or collectively configured to cause the first UE to:
receive information indicating a discontinuous reception (DRX) cycle of a second UE for a sidelink connection between the first UE and the second UE;
identify a mode that specifies whether the second UE is to receive a communication outside of an on duration of the DRX cycle if the on duration is extended due to receiving sidelink control information (SCI) reserving a resource outside of the on duration; and
communicate in accordance with the mode.

23. The apparatus of claim 22, wherein the communication includes a new transport block.

24. The apparatus of claim 22, wherein the one or more processors, to identify the mode, are individually or collectively configured to cause the first UE to:
negotiate the mode with the second UE.

25. The apparatus of claim 22, wherein the one or more processors, to identify the mode, are individually or collectively configured to cause the first UE to:
receive configuration information identifying the mode, wherein the configuration information is for at least one of:
a resource pool,
a bandwidth part, or
a component carrier.

26. The apparatus of claim 22, wherein the mode comprises one of:
a mode in which the second UE is not to receive the communication outside of the on duration if the on duration is extended due to receiving SCI reserving the resource outside of the on duration,
a mode in which the second UE is to receive the communication outside of the on duration if the on duration is extended due to receiving SCI reserving the resource outside of the on duration, or
a mode in which the second UE is to receive the communication outside of the on duration if the on duration is extended due to receiving SCI reserving the resource outside of the on duration subject to a condition associated with the communication.

27. A method of wireless communication performed by a first user equipment (UE), comprising:
configuring a discontinuous reception (DRX) cycle of the first UE for a sidelink connection with a second UE;
identifying a mode that specifies whether the first UE is to receive a communication outside of an on duration of the DRX cycle if the on duration is extended due to receiving sidelink control information (SCI) reserving a resource outside of the on duration; and
communicating in accordance with the mode.

28. The method of claim 27, wherein the mode comprises one of:
a mode in which the first UE is not to receive the communication outside of the on duration if the on duration is extended due to receiving SCI reserving the resource outside of the on duration,
a mode in which the first UE is to receive the communication outside of the on duration if the on duration is extended due to receiving SCI reserving the resource outside of the on duration, or
a mode in which the first UE is to receive the communication outside of the on duration if the on duration is extended due to receiving SCI reserving the resource outside of the on duration subject to a condition associated with the communication.

29. A method of wireless communication performed by a first user equipment (UE), comprising:
receiving information indicating a discontinuous reception (DRX) cycle of a second UE for a sidelink connection between the first UE and the second UE;
identifying a mode that specifies whether the second UE is to receive a communication outside of an on duration of the DRX cycle if the on duration is extended due to receiving sidelink control information (SCI) reserving a resource outside of the on duration; and
communicating in accordance with the mode.

30. The method of claim 29, wherein the mode comprises one of:
a mode in which the second UE is not to receive the communication outside of the on duration if the on duration is extended due to receiving SCI reserving the resource outside of the on duration,
a mode in which the second UE is to receive the communication outside of the on duration if the on duration is extended due to receiving SCI reserving the resource outside of the on duration, or a mode in which the second UE is to receive the communication outside of the on duration if the on duration is extended due to receiving SCI reserving the resource outside of the on duration subject to a condition associated with the communication.

* * * * *